United States Patent [19]

Permut

[11] Patent Number: 4,566,652

[45] Date of Patent: Jan. 28, 1986

[54] TAPE DRIVE HAVING SWING ARM BUFFERS AND AUTOMATIC THREADING

[75] Inventor: Ronald Permut, Boulder County, Colo.

[73] Assignee: Storage Technology Corporation, Louisville, Colo.

[21] Appl. No.: 553,481

[22] Filed: Nov. 18, 1983

[51] Int. Cl.[4] .................... G11B 15/32; G11B 15/66; B65H 17/02; B65H 17/32

[52] U.S. Cl. .................................. 242/189; 226/91; 226/97

[58] Field of Search .................. 242/189, 190, 75.3, 242/195; 360/74.3; 226/91, 97; 406/157–161

[56] References Cited

U.S. PATENT DOCUMENTS 3,544,037  12/1970  Arent ................................ 242/189
3,697,016  10/1972  Leifer et al. ..................... 242/189
4,243,186   1/1981  Peter et al. ...................... 242/195

Primary Examiner—Harvey C. Hornsby
Assistant Examiner—Scott J. Haugland
Attorney, Agent, or Firm—Woodcock Washburn Kurtz Mackiewicz & Norris

[57] ABSTRACT

A magnetic tape drive has two pivoted swing arms positioned respectively between the file reel and the capstan, and between the machine reel and the capstan, and biased away from the reels to apply tension to the tape during operation which decouples the tape and reel inertia from the capstan. The tape passes between a pair of rollers on each of the swing arms and an adjacent fixed roller. In order to thread the tape, the swing arms are retracted out of the tape path so that pneumatic threading may occur. A deflector is positioned between a pair of rollers on one of the swing arms to define a tape threading path.

8 Claims, 7 Drawing Figures

TAPE DRIVE HAVING SWING ARM BUFFERS AND AUTOMATIC THREADING

BACKGROUND OF THE INVENTION

The present invention relates to magnetic tape drives for the storage of digital data and more particularly, to a high speed buffered tape drive having conventional sized reels which can be mounted in a standard rack configuration.

Magnetic tape units for storing digital data typically accelerate tape from a stop to a high speed very rapidly on demand of a processing unit. In order to achieve this, the main mass of the tape must be decoupled from the tape in the immediate vicinity of the capstan and the read/write head.

Typically, vacuum columns have been used to decouple the inertia of tape on the machine and file reels from the capstan. U.S. Pat. No. 4,331,306—Epina, et al shows a magnetic tape drive with vacuum column decoupling which can be mounted in a standard rack configuration.

While vacuum columns are suitable for tape drives in many applications, there are other applications, particularly for small rack-mounted tape drives, in which vacuum columns have significant disadvantages.

Swing arms, or tension arms, have previously been used instead of vacuum columns for buffering the tape drive capstan from the inertia of tape on the reels. U.S. Pat. No. 4,243,186—Peter, et al is an example. This patent discloses a tape drive with a single swing arm and a pneumatic path for automatically threading the tape past the swing arm. Automatic threading is relatively straightforward in such a tape drive, but accomplishing automatic threading in a tape drive with two decoupling double roller swing arms, one arm for each reel, is much more difficult.

It is an object of the present invention to provide a compact digital magnetic tape drive using swing arms to decouple the tape to obtain the advantages of reduced cost and reduced noise when compared to vacuum column buffered tape drives.

It is another object to provide a tape buffering system having a large amount of tape to be buffered in a minimum amount of space and with the ability to accelerate the tape to final velocity rapidly.

It is another object of the present invention to provide automatic threading in a magnetic tape drive in which two swing arms decouple the inertia of the tape on the reels from the capstan and in which tape is tensioned during running by swing arms having two rollers which draw two loops of tape across a fixed roller.

RELATED APPLICATIONS

"TAPE DRIVE HAVING SWING ARM BUFFER AND AUTOMATIC THREADING," Apple, et al, Ser. No. 554,428, filed Nov. 22, 1983, discloses and claims specific features of the automatic threading system of this invention. That application is incorporated herein by reference.

SUMMARY OF THE INVENTION

In accordance with the invention, a magnetic tape drive has two pivoted swing arms, one positioned between the file reel and the capstan, and the other between the machine reel and the capstan. Fixed rollers are positioned adjacent to each of the swing arms. The swing arms are biased away from the reels and have a pair of rollers. The magnetic tape passes between a fixed roller and the pair of rollers on the adjacent swing arm so that the bias respectively decouples the inertia of tape on the file and machine reels from the capstan.

A compact configuration of the reels and tape path is provided in accordance with the invention by locating the file reel hub below the machine reel and having the read/write head, capstan, fixed rollers, and swing arms located to define a vertical tape path in a narrow area beside the reels.

Automatic threading is accomplished in accordance with the invention by retracting the swing arms toward the reels and out of the tape path during threading. A pivoted deflector adjacent one of the swing arms moves to a position between the pair of fixed rollers to prevent tape from passing between the pair of rollers during threading. In this position, a pneumatic path is provided to move the tape between the file reel and the machine reel for automatic threading.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

The magnetic tape drive of the present invention includes a file reel 11 and a machine reel 12. Magnetic tape is driven between these reels past a magnetic read/write head 13 by a capstan 14.

Figure 2:
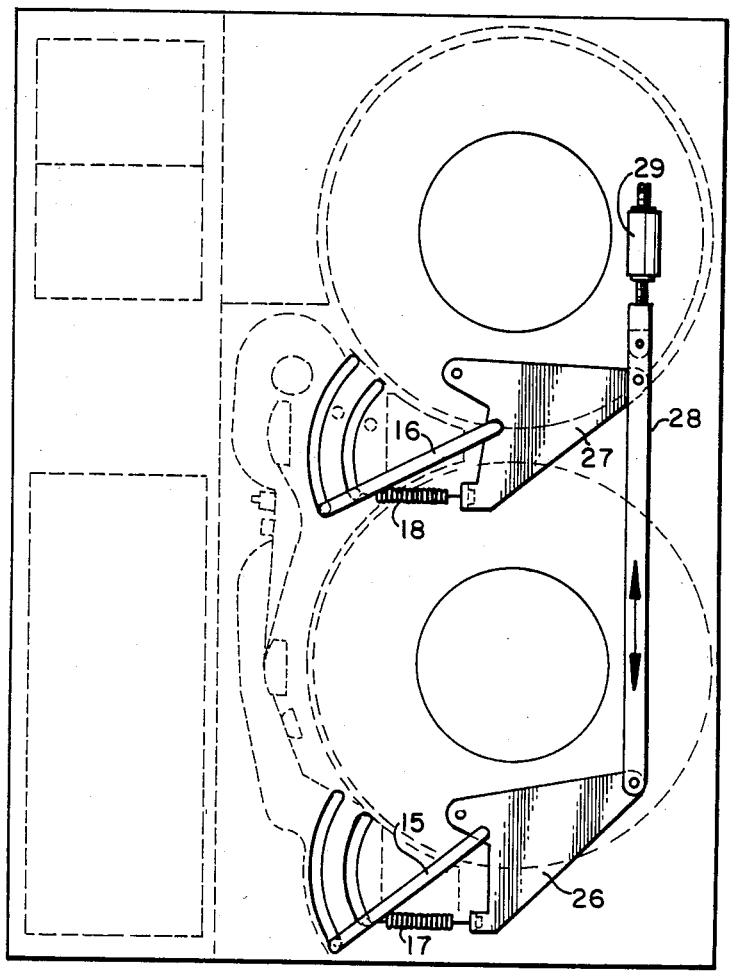
FIG. 2 shows the rear of the tape drive.
Figure 3:
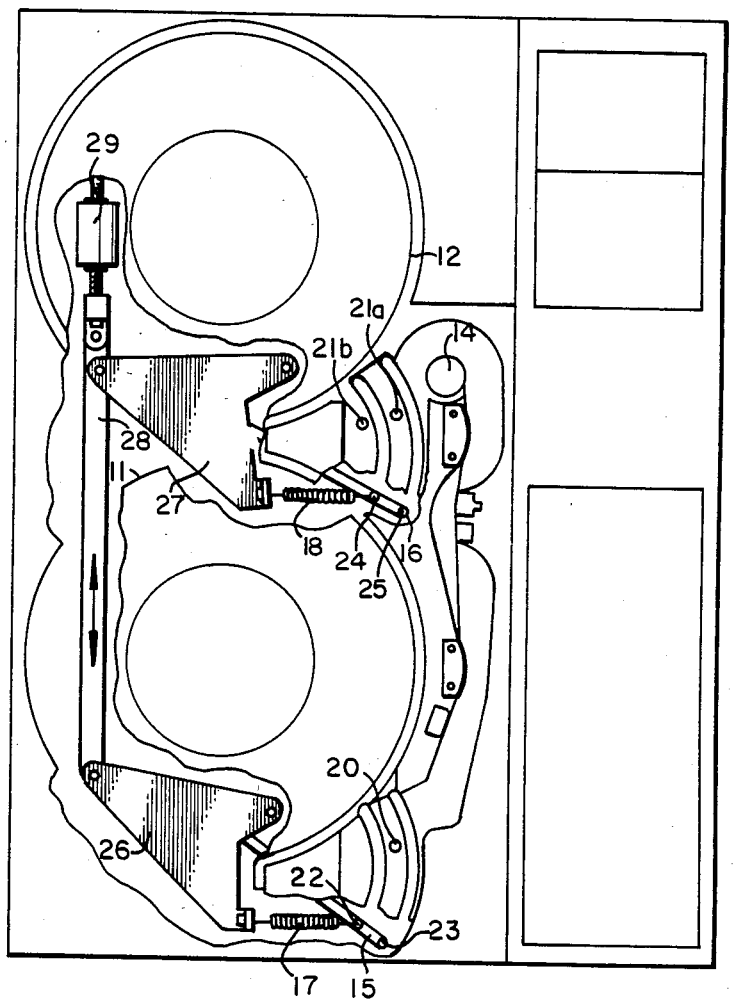
FIG. 3 is a front view, partially broken away to depict the swing arm and threading operations.

A first pivoted swing arm 15 (FIG. 2) is positioned in the tape path between the file reel and capstan 14. A second swing arm 16 is positioned in the tape path between the machine reel 12 and the capstan 14. The swing arms are biased away from the reels by springs 17 and 18 (FIG. 2). The vertical tape path from the file reel 11 to the machine reel 12 is closed on three sides by the base casting. A clear plastic cover completely encloses this path to provide a pneumatic trough from the bottom of the drive to the machine reel 12. A vacuum motor (not shown) draws air through the tape path during automatic threading.

Figure 5:
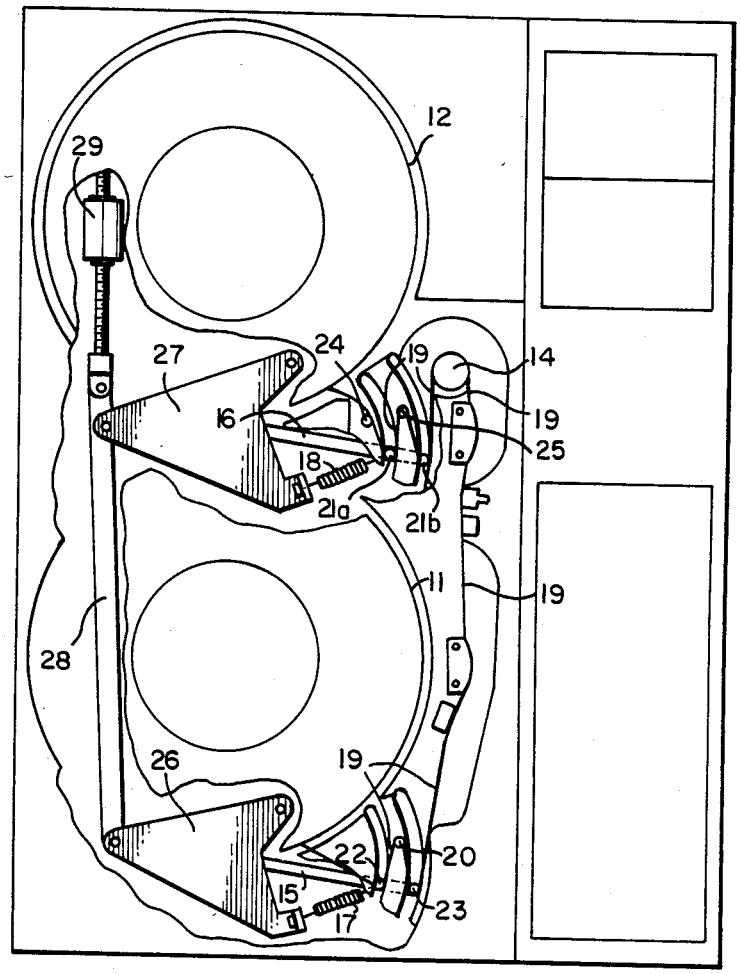
FIG. 5 is similar to FIG. 3 and shows the tape path during operation.

Swing arm 15 has a pair of fixed rollers 22 and 23. Fixed roller 20 is positioned adjacent the rollers 22 and 23 on swing arm 15. Fixed rollers 21a and 21b are positioned adjacent the pair of rollers 24 and 25 on swing arm 16. When the tape drive is in its operating condition, shown in FIG. 5, the tape 19 passes between one of the fixed rollers and the pair of rollers on the adjacent swing arm so that the bias on the swing arm decouples the inertia of the tape on the file and machine reels from the capstan. In accordance with the invention, the two tape rollers are attached to a relatively short, low mass, pivoted swing arm. The spring bias and its attachment point to the swing arm are calculated from the system geometry to provide constant tape tension throughout the swing arm stroke.

The three roller system of the present invention provides twice the length of tape buffering of a single roller swing arm. For a force applied to the end of the tape, the forces to accelerate the two roller arm are approximately twice the forces to accelerate a one roller arm. The acceleration of the two roller arm is approximately twice that of the one roller arm for arms of equal inertia. This provides an advantageous tape path with good decoupling from the inertia of the tape on the file and machine reels.

Figure 4:
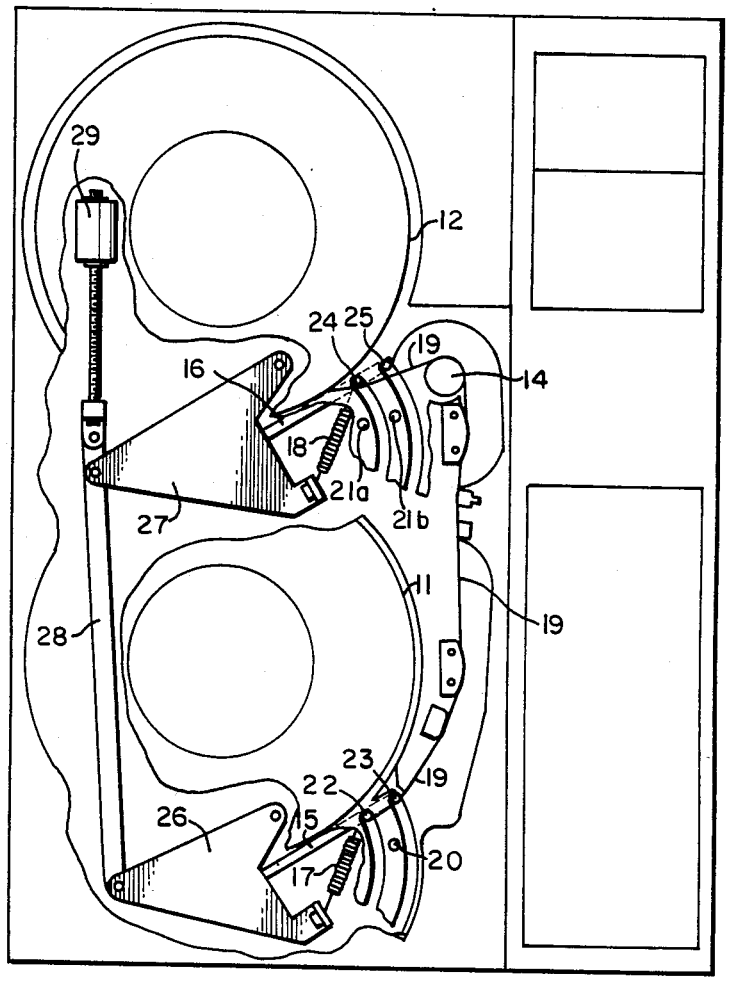
FIG. 4 is similar to FIG. 3 and shows the tape path during threading.

However, the tape path is a complicated one insofar as automatic threading is concerned. In accordance with the present invention, automatic threading is accomplished by retracting the swing arms toward the file and machine reels and out of the tape path during threading. FIG. 4 depicts the swing arms in the retracted position with the rollers 22–25 out of the threading path. The swing arms are retracted by bell cranks 26 and 27. Swing arm 15 is pivoted on bell crank 26 and swing arm 16 is pivoted on bell crank 27. Spring 17 connects swing arm 15 with bell crank 26 to bias it and spring 18 provides the bias for swing arm 16. Bell cranks 26 and 27 are pivoted on the base casting. A connecting rod 28 connects the bell cranks to a retractor motor 29.

Figure 1:
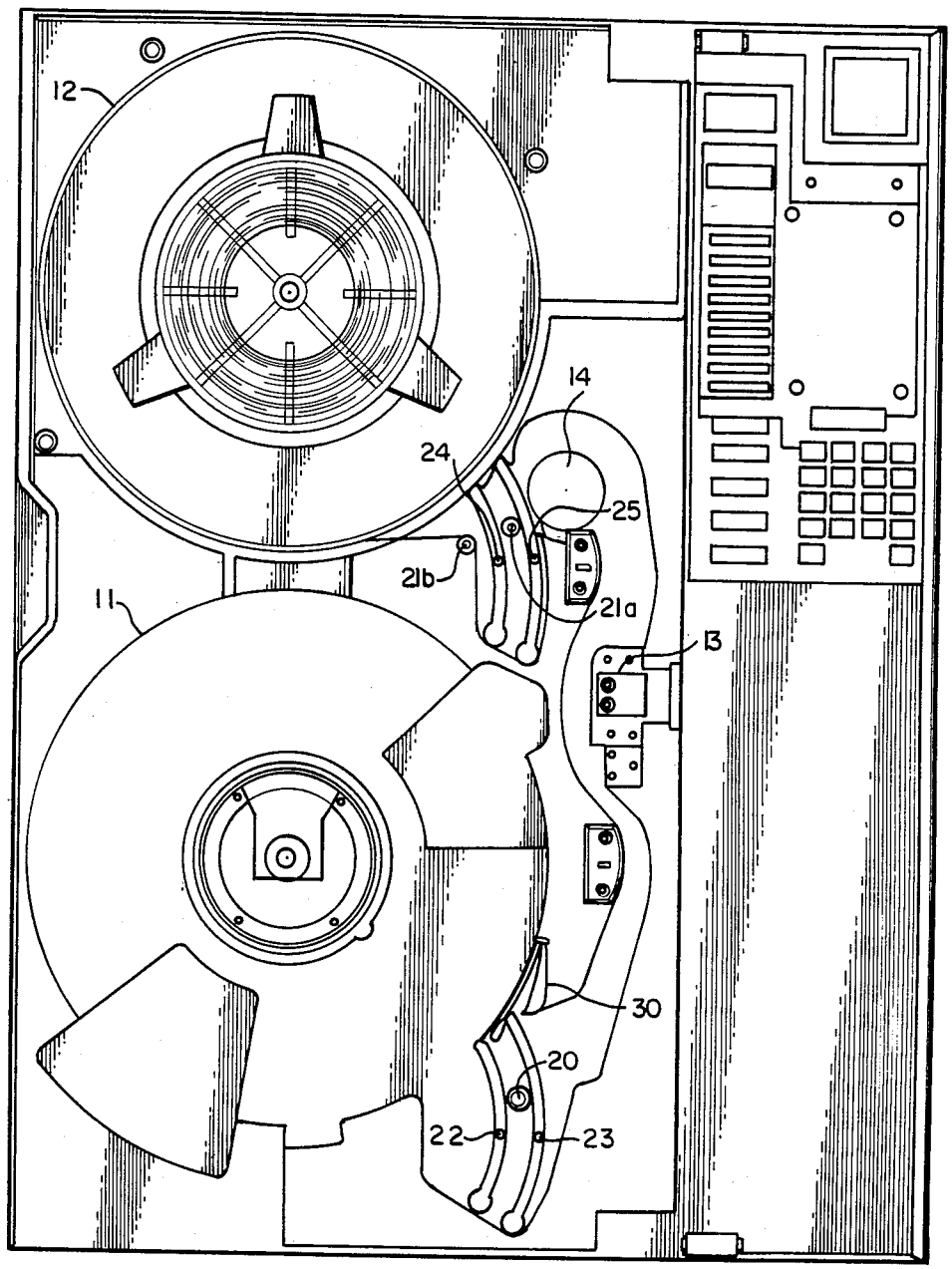
FIG. 1 shows the front of the tape drive of the present invention.
Figure 6:
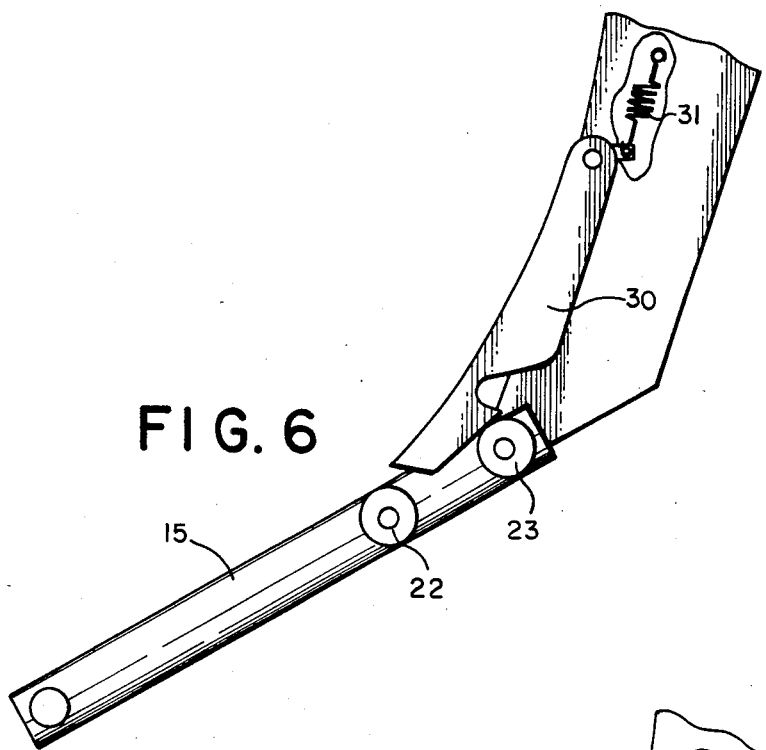
FIGS. 6 and 7 show the deflector in the threading and operating positions respectively.
Figure 7:
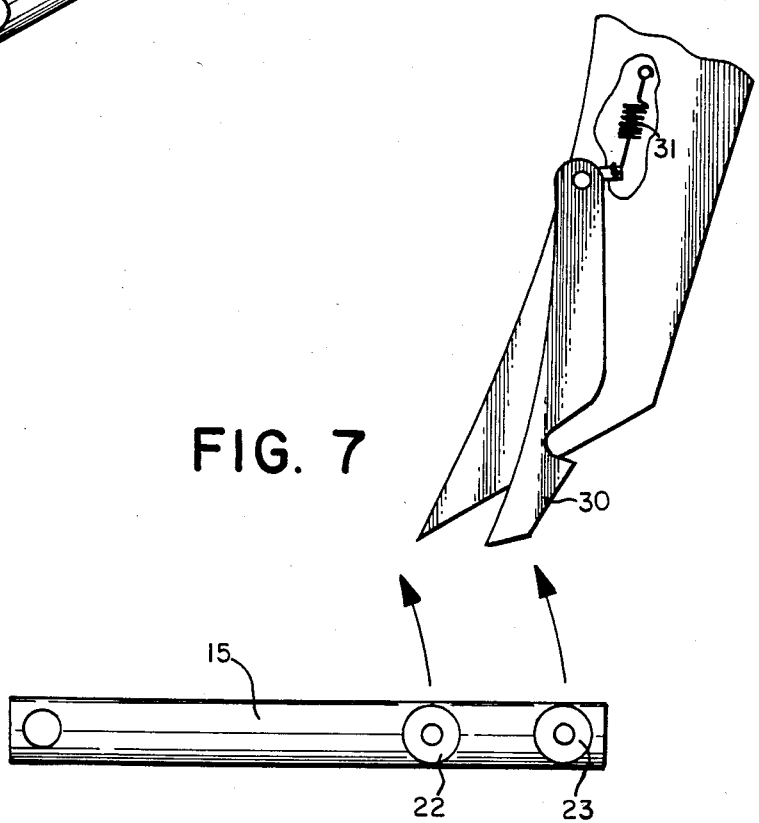

In order to complete the threading path, a deflector 30 (FIGS. 1, 6 and 7) is positioned between the retracted movable rollers 22 and 23. If the deflector 30 is not properly positioned, the tape from file reel 11 will pass between the rollers 22 and 23 resulting in imporper threading. The deflector 30 is biased away from the file reel by the spring 31 (FIG. 7) during normal operation. During threading, as swing arm 15 is retracted, roller 23 bears against deflector 30 to move it to a position in which it spans the rollers 22 and 23, as shown in FIG. 6. This completes the threading path.

While a particular embodiment of the invention has been shown and described, various modifications are within the true spirit and scope of the invention. The appended claims are, therefore, intended to cover all such modifications.

What is claimed is:

1. A magnetic tape drive of the type in which magnetic tape is driven past a magnetic read/write head between a machine reel and a file reel by a capstan comprising:
    first and second pivoted swing arms respectively positioned between said file reel and said capstan and between said machine reel and said capstan and respectively biased away from said file reel;
    fixed rollers positioned adjacent each of said first and second swing arms;
    a pair of rollers on each of said swing arms, said tape passing between a fixed roller and the pair of rollers on the adjacent swing arm so that the bias on said first and second swing arms respectively decouple the inertia of tape on said file and machine reels from said capstan;
    pneumatic means for transporting tape along a path between said file reel and said machine reel for automatically threading tape;
    first and second members respectively connected to said first and second swing arms, said members being movable to retract said swing arms toward said file and machine reels and out of said path during threading; and
    a pivoted deflector adjacent one of said swing arms, said deflector being movable to a position between the pair of fixed rollers on said swing arm to prevent tape from passing between said pair of rollers during threading.

2. The tape drive recited in claim 1 further comprising:
    a file reel hub located below said machine reel, said magnetic read/write head, capstan, fixed rollers and swing arms being located to define a vertical tape path beside said file and machine reels.

3. The tape drive recited in claim 1 wherein said deflector is positioned adjacent said file reel and biased away from said file reel, one of said pair of rollers on said swing arm engaging said deflector to move it into a position spanning said rollers as said swing arm is retracted.

4. The tape drive recited in claim 1 wherein said first and second members comprise:
    first and second bell cranks, said first and second swing arms being respectively pivoted on said bell cranks; and
    a spring between each swing arm and its respective bell crank for biasing said swing arms away from said reels.

5. The tape drive recited in claim 4 further comprising:
    means for rotating said bell cranks to move the pair of rollers on said swing arms out of the tape path during threading.

6. The tape drive recited in claim 4 further comprising:
    a base on which the components of said tape drive are mounted, said bell cranks being pivoted on said base;
    a connecting rod between said bell cranks; and
    a retractor motor for moving said connector rod to rotate said bell cranks thereby retracting said swing arms out of said tape path.

7. A magnetic tape drive of the type in which magnetic tape is driven past a magnetic read/write head between a file reel and a machine reel by a capstan comprising:
    a pivoted swing arm positioned between one of said reels and said capstan and biased away from said reel;
    a fixed roller positioned adjacent said swing arm;
    a pair of rollers on said swing arm, said tape passing between said fixed rollers and the pair of rollers on said swing arm so that the bias on said swing arm decouples the inertia of tape on said reel from said capstan;
    pneumatic means for transporting tape in a tape path between said file reel and said machine reel for automatic threading;
    means for retracting said swing arm out of said tape path during threading; and
    a pivoted deflector adjacent said swing arm, said deflector being movable to a position between the pair of fixed rollers on said swing arm to prevent tape from passing between said pair of rollers during threading.

8. The tape drive recited in claim 7 wherein said deflector is positioned adjacent said file reel and biased away from said file reel, one of said pair of rollers on said swing arm engaging said deflector to move it into a position spanning said rollers as said swing arm is retracted.

* * * * *